F. F. SCHRODER.
REINFORCED BABBITT JOURNAL BEARINGS.
APPLICATION FILED AUG. 21, 1915.
1,164,125.
Patented Dec. 14, 1915.
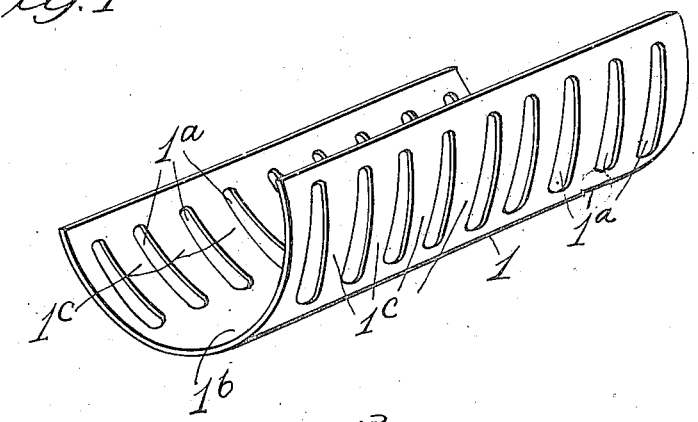
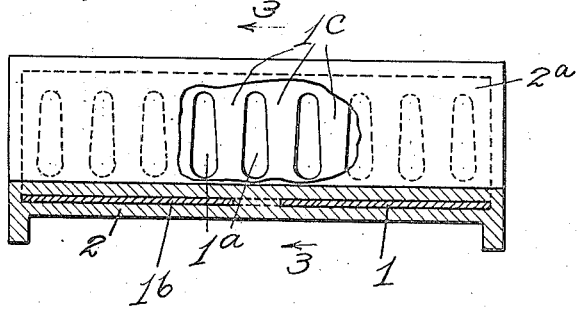
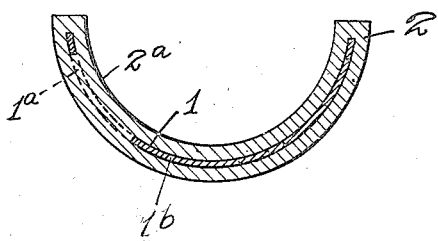

UNITED STATES PATENT OFFICE.

FRED F. SCHRODER, OF CHICAGO, ILLINOIS, ASSIGNOR TO THE STEWART MANUFACTURING COMPANY, OF CHICAGO, ILLINOIS, A CORPORATION OF ILLINOIS.

REINFORCED BABBITT JOURNAL-BEARINGS.

1,164,125.

Specification of Letters Patent.

Patented Dec. 14, 1915.

Application filed August 21, 1915. Serial No. 46,622.

*To all whom it may concern:*

Be it known that I, FRED F. SCHRODER, a citizen of the United States, residing at Chicago, in the county of Cook and State of Illinois, have invented new and useful Improvements in Reinforced Babbitt Journal-Bearings, of which the following is a specification, reference being had to the accompanying drawings, forming a part thereof.

The purpose of this invention is to provide an improved construction of a Babbitt journal bearing or journal box lining having hard metal reinforcements inclosed within the soft metal.

It consists in the elements and features of construction shown and described as indicated in the claims.

In the drawings: Figure 1 is a perspective view of the hard metal reinforcement employed in the journal bearing embodying this invention. Fig. 2 is a longitudinal section of such journal bearing. Fig. 3 is a transverse section of the same.

In the drawings 1 is a hard metal reinforcement of the journal bearing.

2 is the soft metal within which the hard metal reinforcement, 1, is completely inclosed.

The journal bearing shown in the drawings is designed to be made by the process of die casting and it will be understood that customary means are employed for upholding the reinforcement, 1, in the cavity of the die, while the soft metal is being injected, until the soft metal has sufficiently surrounded the reinforcement to hold it in place, whereupon the reinforcement-supporting element of the die is withdrawn and its space also filled by the soft metal. These details of the process of manufacture are mentioned only to indicate the well known possibility of making the journal bearing with the reinforcement completely surrounded by the soft metal.

The reinforcement, 1, is made of hard sheet metal, as steel, perforated to render it a skeleton so that the soft metal may freely run through it and engage it and suitably shaped in a die to curve it in cylindrical form about the axis of the seating surface, $2^a$, of the journal bearing. The characteristic of the reinforcement consists in the position and form of the perforations by which it is rendered a skeleton, said perforations, $1^a$, being in the form of slots having their length extending circumferentially with respect to the bearing, and comprised in two groups at opposite sides of the longitudinal middle line of the reinforcement, said reinforcement having preferably a longitudinally-extending unperforated area, $1^b$, which may be called the "spine" of the reinforcement, said perforations, $1^a$, being tapered narrowing from the ends next to said "spine" as they extend circumferentially around the bearing, forming between them "ribs," $1^c$, tapered widening from the "spine" around the bearing. The specific purpose and advantage of this construction is that the effect of the load which may be imposed upon the bearings by the shaft lodged therein, in so far as that load may tend to compress the soft metal and thereby to spread it away from the center outward toward both sides, causes it to be wedged in the tapering slots, $1^a$, and to grip the reinforcement more tightly on account of the load thus imposed upon it; and this effect operating at both sides and in opposite directions at the two sides, tends to prevent any creeping of the reinforcement in the soft metal by reason of the effect of the load operating to compress the metal.

I claim:—

1. A journal bearing comprising a hard metal reinforcement and soft metal inclosing said reinforcement, the reinforcement being formed of sheet metal curved about the axis of the bearing surface, and perforated by slots having their length circumferential with respect to said bearing surface and tapered narrowing from a line near the vertical central longitudinal plane of the bearing around toward the horizontal plane of the axis.

2. A journal bearing comprising a hard metal reinforcement and soft metal inclosing said reinforcement, the reinforcement being formed of sheet metal curved about the axis of the bearing surface and provided with slots in two groups at opposite sides of a spine extending longitudinally, said slots having their lengths extending circumferentially with respect to the bearing surface and tapered narrowing from said spine around toward the horizontal plane of the axis.

In testimony whereof, I have hereunto set my hand at Chicago, Illinois, this 18th day of August, 1915.

FRED F. SCHRODER.

Witnesses:
ROBT. N. BURTON,
LUCY I. STONE.